US009248823B2

(12) United States Patent
MacNeille et al.

(10) Patent No.: US 9,248,823 B2
(45) Date of Patent: Feb. 2, 2016

(54) METHOD AND APPARATUS FOR PROVIDING PARKING INSTRUCTIONS TO REDUCE ENVIRONMENTAL VEHICLE EFFECTS

(71) Applicant: Ford Global Technologies, LLC, Dearborn, MI (US)

(72) Inventors: Perry Robinson MacNeille, Lathrup Village, MI (US); Yimin Liu, Ann Arbor, MI (US); Michael Edward Loftus, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 14/172,274

(22) Filed: Feb. 4, 2014

(65) Prior Publication Data

US 2015/0217754 A1      Aug. 6, 2015

(51) Int. Cl.
*B60L 9/00* (2006.01)
*B60W 10/26* (2006.01)
*B60Q 1/48* (2006.01)
*G08G 1/14* (2006.01)

(52) U.S. Cl.
CPC .................. *B60W 10/26* (2013.01); *B60Q 1/48* (2013.01); *B60W 2510/244* (2013.01); *B60W 2510/246* (2013.01); *B60W 2550/12* (2013.01); *G08G 1/14* (2013.01); *G08G 1/147* (2013.01)

(58) Field of Classification Search
CPC ........... G08G 1/14; G08G 1/147; B60Q 1/48; B60W 30/06; G01S 17/08; G07B 15/02; B60R 16/0231; B60R 16/0315
USPC ............ 701/22, 36, 96, 117; 340/932.2, 903, 340/905, 988, 4.6
See application file for complete search history.

(56) References Cited

U.S. PATENT DOCUMENTS

| | | | |
|---|---|---|---|
| 5,432,508 A * | 7/1995 | Jackson | 340/932.2 |
| 5,648,906 A * | 7/1997 | Amirpanahi | 705/418 |
| 5,910,782 A * | 6/1999 | Schmitt et al. | 340/995.12 |
| 6,147,624 A * | 11/2000 | Clapper | 340/932.2 |
| 6,340,935 B1 * | 1/2002 | Hall | 340/932.2 |
| 7,746,026 B2 | 6/2010 | Koziara et al. | |
| 8,212,527 B2 | 7/2012 | Zhang et al. | |
| 2008/0150490 A1 | 6/2008 | Koziara et al. | |
| 2009/0157232 A1 | 6/2009 | Drogosch et al. | |
| 2010/0211340 A1 | 8/2010 | Lowenthal et al. | |
| 2013/0231826 A1 | 9/2013 | Zhang et al. | |

OTHER PUBLICATIONS

Phys Org, Understanding the life of lithium ion batteries in electric vehicles, NASA Prototype Lithium-Ion Polymer Battery, Apr. 10, 2013.

* cited by examiner

*Primary Examiner* — Gertrude Arthur Jeanglaude
(74) *Attorney, Agent, or Firm* — Jennifer M. Stec; Brooks Kushman P.C.

(57) ABSTRACT

A system includes a processor configured to receive parking space environmental characteristics, from a vehicle parked in a parking space. The processor is also configured to download weather data for an area in which the parking space is located, covering a time duration for which the vehicle was parked. The processor is further configured to correlate the weather data to the received environmental characteristics to build a parking space environment profile for the duration of time and update a parking space model based on the environment profile.

20 Claims, 4 Drawing Sheets

METHOD AND APPARATUS FOR PROVIDING PARKING INSTRUCTIONS TO REDUCE ENVIRONMENTAL VEHICLE EFFECTS

TECHNICAL FIELD

The illustrative embodiments generally relate to a method and apparatus for providing parking instructions to reduce environmental vehicle effects.

BACKGROUND

The lithium ion batteries for a midrange Battery Electric Vehicle (BEV) can cost between $12,000 and $15,000, making it is the most expensive component of the vehicle (constituting some 38% of the total vehicle cost to the consumer). Accordingly, a major customer concern is the cost of a battery failure, so competitive vehicles must carry a long warrantee on the battery (often, for example, 8 years or 100,000 miles).

Presently BEV battery failures are rare, but BEV vehicles are too expensive to compete with conventional vehicles and they are produced in very low numbers. Cost reduction and increasing assembly volumes can only be maximized by designing batteries that meet the minimum ruggedness requirements consistent with lifetime cost of the vehicle. It is possible to reduce the ruggedness requirements and consequently the manufacturing cost of the battery through several methods often only if significant computational and data acquisition and storage capacity is available.

U.S. Patent Application 2009/0157232 generally relates to a method for preserving battery operation and life during vehicle post idle shutdown, such vehicle having a delayed accessory power mode operative when an ignition state of the vehicle is in a non-engine running condition while an ignition switch of the vehicle is in the ON position to supply accessories in the vehicle the battery. The method includes: detecting whether the vehicle has been in an post idle shutdown condition and brake pedal not pressed and ignition state unchanged; and placing the vehicle in the delayed accessory power mode after detecting that the vehicle has been in an post idle shutdown condition and while the ignition switch is in the ON position.

SUMMARY

In a first illustrative embodiment, a system includes a processor configured to receive parking space environmental characteristics, from a vehicle parked in a parking space. The processor is also configured to download weather data for an area in which the parking space is located, covering a time duration for which the vehicle was parked. The processor is further configured to correlate the weather data to the received environmental characteristics to build a parking space environment profile for the duration of time and update a parking space model based on the environment profile.

In a second illustrative embodiment, a system includes a processor configured to determine that a vehicle is proximate to a parking location. The processor is also configured to retrieve an environmental model for the parking location. The processor is further configured to retrieve weather data for the parking location. Also, the processor is configured to build a forecast model for the parking location covering an estimated parking duration. The processor is additionally configured to determine a first parking space having better battery life preservation likelihood than another parking space, within the parking location, based on the forecast model and recommend the first parking space.

In a third illustrative embodiment, a system includes a processor configured to receive an estimated parking duration for a parked vehicle. The processor is also configured to receive an forecast model for a parking space in which the vehicle is parked. Further, the processor is configured to determine a surplus amount of battery energy. The processor is also configured to determine a cooling strategy for a vehicle battery, based on the surplus energy and the forecast model and implement the cooling strategy at least while the vehicle remains parked.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
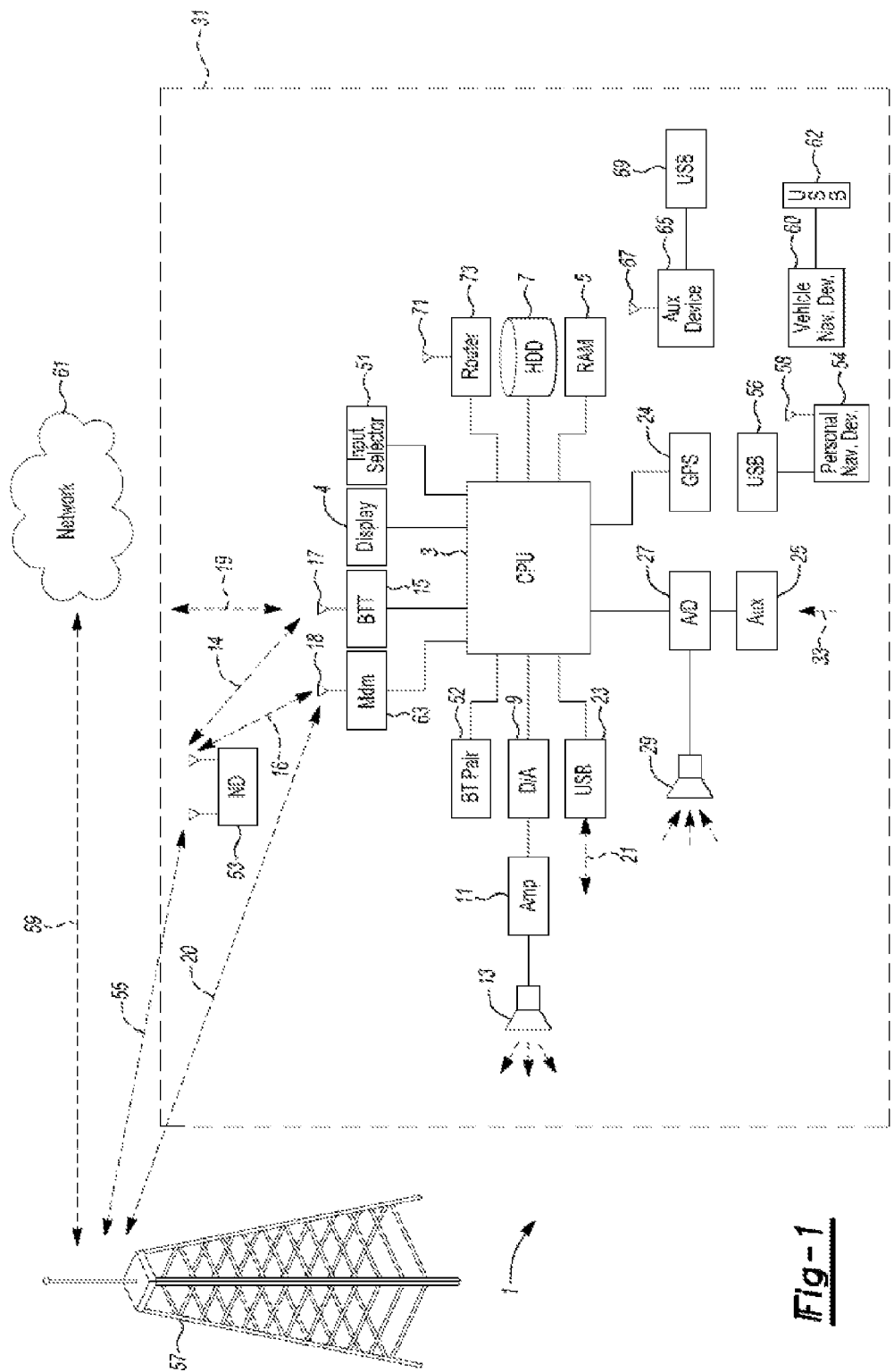
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a universal serial bus (USB) input 23, a global positioning system (GPS) input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a controller area network (CAN) bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, personal digital assistant (PDA), or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the central processing unit (CPU) is instructed that the onboard BLUETOOTH transceiver will be paired with a BLUETOOTH transceiver in a nomadic device.

Data may be communicated between CPU 3 and network 61 utilizing, for example, a data-plan, data over voice, or dual-tone multi-frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

A vehicle used for typical consumer purposes spends most of its time turned off, and temperature and state-of-charge (SOC) are critical to lithium ion battery life during this time. The following functions describe the growth of resistance and the fade of capacitance at various states of charge. The functions demonstrate that a fully charged battery grows significantly in resistance over time and fades significantly in capacity, as compared to, for example, a battery kept at a 20% SOC.

Resistance Growth at 100% SOC: $R(T)_{100} = 4.0806 \times T^2 + 52.049T + 972.52$ Resistance Growth at 60% SOC: $R(T)_{60} = 2.8591T^2 - 3.9611T + 538.71$ Resistance Growth at 20% SOC: $R(T)_{20} = 1.6184T^2 + 8.9448T + 102.22$ Fade at 100% SOC: $F(T)_{100} = 4.0806T^2 + 52.049 \times T + 972.52$ Fade at 60% SOC: $F(T)_{60} = 2.8591T^2 - 3.9611 \times T + 538.71$ Fade at 20% SOC: $F(T)_{20} = 1.6184T^2 + 8.9448T + 102.22$ Three functions of damage with respect to temperature can be derived:

$D(T)_{100} = \alpha R(T)_{100} + \beta F(T)_{100}$ $D(T)_{60} = \alpha R(T)_{60} + \beta F(T)_{60}$ $D(T)_{20} = \alpha R(T)_{20} + \beta F(T)_{20}$ Assuming that the random temperature variable is expressed as a Weibull function, T, λ and K are output from the Black Box Model, the variable P represents the likelihood that the temperature is less than T.

$$P(T; \lambda; K)_{cdf} = \frac{K}{\lambda}\left(\frac{T}{\lambda}\right)^{K-1} e^{-\left(\frac{T}{\lambda}\right)^K}$$

The likelihood that the battery damage will be less than a particular value is estimated as follows. Three temperature values are computed for the mean, mean plus standard deviation and mean minus standard deviation (μ, μ+σ, μ−σ) because they are easy to compute. For the Weibull function the equations follow:

$$\mu = \lambda \Gamma\left(1 + \frac{1}{K}\right), \sigma = \sqrt{\lambda^2 \, \Gamma\left(1 + \frac{2}{K}\right) - \mu^2}$$

Where μ and σ are in units of temperature.

Next $D(T)_{100}$, $D(T)_{60}$, $D(T)_{20}$ are computed for T=μ, T=μ+σ, T=μ−σ giving $D(\mu)_{100}$, $D(\mu+\sigma)_{100}$, $D(\mu-\sigma)_{100}$, $D(\mu)_{60}$, $D(\mu+\sigma)_{60}$, $D(\mu-\sigma)_{60}$, $D(\mu)_{20}$, $D(\mu+\sigma)_{20}$, $D(\mu-\sigma)_{20}$. From the three $D_{100}$ values the Weibull variables λ and k for $D_{100}$, so the cumulative distribution function for the random variable $D_{100}$ will have the same form as that for temperature (T) as shown above.

$$P(D_{100}; \lambda; K)_{cdf} = \frac{K}{\lambda}\left(\frac{D_{100}}{\lambda}\right)^{K-1} e^{-\left(\frac{D_{100}}{\lambda}\right)^K}$$

Similar equations can be made for $D_{60}$, $D_{20}$ so that $D_{100}$, $D_{60}$, $D_{20}$ can be expressed as random variables.

To develop a real function for damage from both T and SOC, three equations are used at the onset:

$D(T)_{100} = \alpha R(T)_{100} + \beta F(T)_{100}$ $D(T)_{60} = \alpha R(T)_{60} + \beta F(T)_{60}$ $D(T)_{20} = \alpha R(T)_{20} + \beta F(T)_{20}$ A quadratic interpolation function is developed as follows:

$D(T,S) = AS^2 + BS + C$

Where A,B,C are determined by solving the following matrix equation.

$$\begin{bmatrix} D(T)100 \\ D(T)60 \\ D(T)20 \end{bmatrix} = \begin{bmatrix} 100^2 & 100 & 1 \\ 60^2 & 60 & 1 \\ 20^2 & 20 & 1 \end{bmatrix} \begin{bmatrix} A \\ B \\ C \end{bmatrix}$$

If T is computed as a random variable from the black box, D(T,S) can be computed as a random variable as is described in another figure in which D(T) is computed as a random variable.

The black box represents a forecast of the temperature as it varies in time as a time series of T values for each time interval. The parking space ranking module converts the time series into damage series and has algorithms for estimating total damage for the expected parking time window and distance from the final objective. In one example, it determines which parking spots have the best value during the time interval so the driver can be directed to those spots.

Operation of a battery cooling system while the vehicle is turned off can help keep the battery cool and a low state of charge can be maintained until shortly before the vehicle is needed. This is a good way to maximize battery life if charging is available. When charging not available, which is frequently the case, choosing a cool parking location and maintaining as low a state of charge as possible are the best strategy, but difficult to do in practice (since future temperature and/or shade conditions are often not known).

It can be very difficult to predict the temperature of a parking space during the interval in which a vehicle is expected to park there because there are many unknown temperature-affecting factors. If the space is in the open, the sun is high and the weather clear, it will be hot during the day but likely cool at night. So this would be a good place to park at night, but a bad place during the day. If the space is shaded under the same conditions it may be cooler during the day but warmer at night. The situation varies under cloudy conditions, windy conditions, etc., making it difficult for a driver to incorporate into their parking decisions.

An application program running on a VCS platform and, for example, incorporated into a social network content delivery network, and which further has access to vehicle sensors, can be used to help the driver locate an optimal parking space and the vehicle to implement an SOC strategy. The application will use back-end services from a weather provider to provide data that is unavailable from vehicle sensors and from a map provider for data unavailable on the vehicle. Of course, neither the social network nor the vehicle sensors are necessary, as the application could simply pull all relevant data from a cloud server.

The application may include two phases if sensors are available, a data gathering and sharing phase and parking strategy phase. The parking strategy phase may include an advisory feature and a state-of-charge management feature.

In the data gathering and sharing phase, vehicle sensors are used to collect location information from parked vehicles and any weather related information that is available such as, but not limited to, temperature, time of day, date, humidity, barometric pressure and solar heating. This data is augmented with data available from back-end weather services to provide meteorological data such as wind speed and direction. All the meteorological data is used to train a black-box model for predicting the temperature at the location of the parked vehicle. Other vehicles that park in the same location also contribute to the training of the black-box model. The black box model may be implemented as a software module and in the content delivery network.

As a vehicle enters the parking area, the driver informs the application, via a human-machine interface (HMI), for example, of the final destination, the time interval the vehicle is expected to be parked, and information relating to how far the vehicle must travel after parking to reach the next charging location. The application then combines known parking locations acquired from historical locations of parked vehicles with the locations of currently parked vehicles and applies the black-box model to determine a set of vacant parking spaces close to the final destination with favorable temperature profiles. The human-machine interface can then be used to direct the driver to these preferred parking locations.

Once parked, the black-box model of the selected parking space is combined with the weather forecast from the back-end weather service to produce a temperature forecast for the parking space. The minimum battery state of charge requirement is determined using the next charge location provided by the driver and a distance to empty calculation. The battery control system then implements a strategy for cooling the battery using excess battery state-of-charge that takes the battery down to the minimum state-of-charge while cooling during the most damaging portions of the parking interval.

Figure 2:
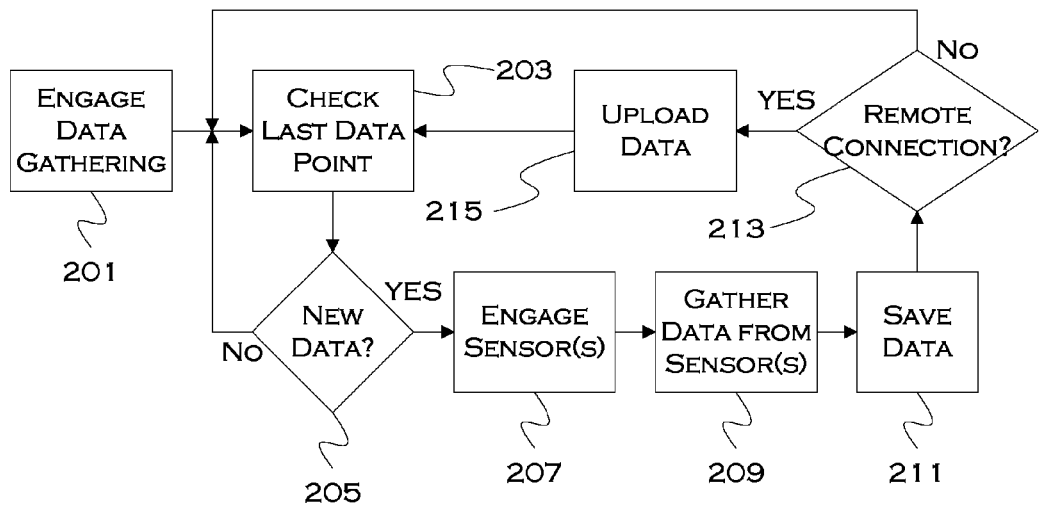
FIG. 2 shows an illustrative process for data gathering.

FIG. 2 shows an illustrative process for data gathering. In this illustrative example, the process will engage in data gathering at any number of vehicles that have the appropriate sensors provided thereto. By using this crowd-sourced data, models for actual temperature profiles associated with various parking spots on various days of the year under various current weather conditions (current for the time when the data was gathered) can be determined.

In this example, once the vehicle is parked at a location, data gathering can begin 201. This illustrative example engages in data gathering for some or all of the time the vehicle is parked in the location. In this example, because data gathering is ongoing, the process first checks a last data point gathered (if any) 203 to determine if it is time to gather new data 205. For example, data may be gathered every five minutes, every half hour, etc.

If new data is needed, the process will engage any number of appropriate vehicle sensors 207. These can be, for example, without limitation, humidity, temperature, ambient light, wind speed, etc. sensors. Data is gathered from the accessed and engaged sensors 209 and the data is saved locally 211. At some point, when a connection to a remote system is available 213, the process will upload the data to the remote system 215. This data can then be used to build both a local temperature/weather profile (for use in this and possibly other concepts) and a model for the current parking space under current weather conditions on the current day/time of year.

A relatively few number of vehicles can gather a rather significant amount of data about parking space characteristics in a relatively short period (a few months or a year or two) of time. This data can be used to profile the parking spaces and used, in the future, to recommend which parking spaces should be utilized under which weather conditions at which times. Also, parking spaces sharing similar characteristics in a similar area of the country can be assumed to have relatively similar profiles, so some measure of extrapolation can be used to quickly model spaces for which data is unavailable or for which limited data is available (e.g., an uncovered, un-shaded parking space in one location is probably similar in characteristics to another, similarly situated space a half mile away).

Figure 3:
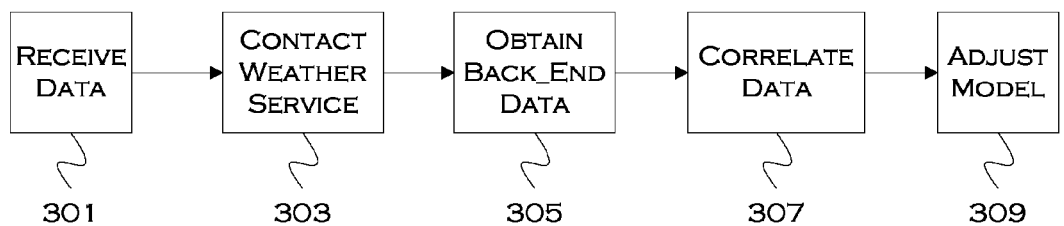
FIG. 3 shows an illustrative process for further data gathering.

FIG. 3 shows an illustrative process for further data gathering. In this example, the process receives vehicle data over some time period (reported periodically or when a vehicle is driven out of a space) 301. The process then contacts a weather data provision service 303, which stores weather data for the day, for example. Weather data, for the location at which the vehicle was/is parked, and for the duration of the parking, is obtained from the service 305.

This data can then be correlated to noted sensor data from the vehicle, to further determine characteristics of the parking space 307. A model of the particular parking space can then be adjusted as appropriate 309.

Figure 4:
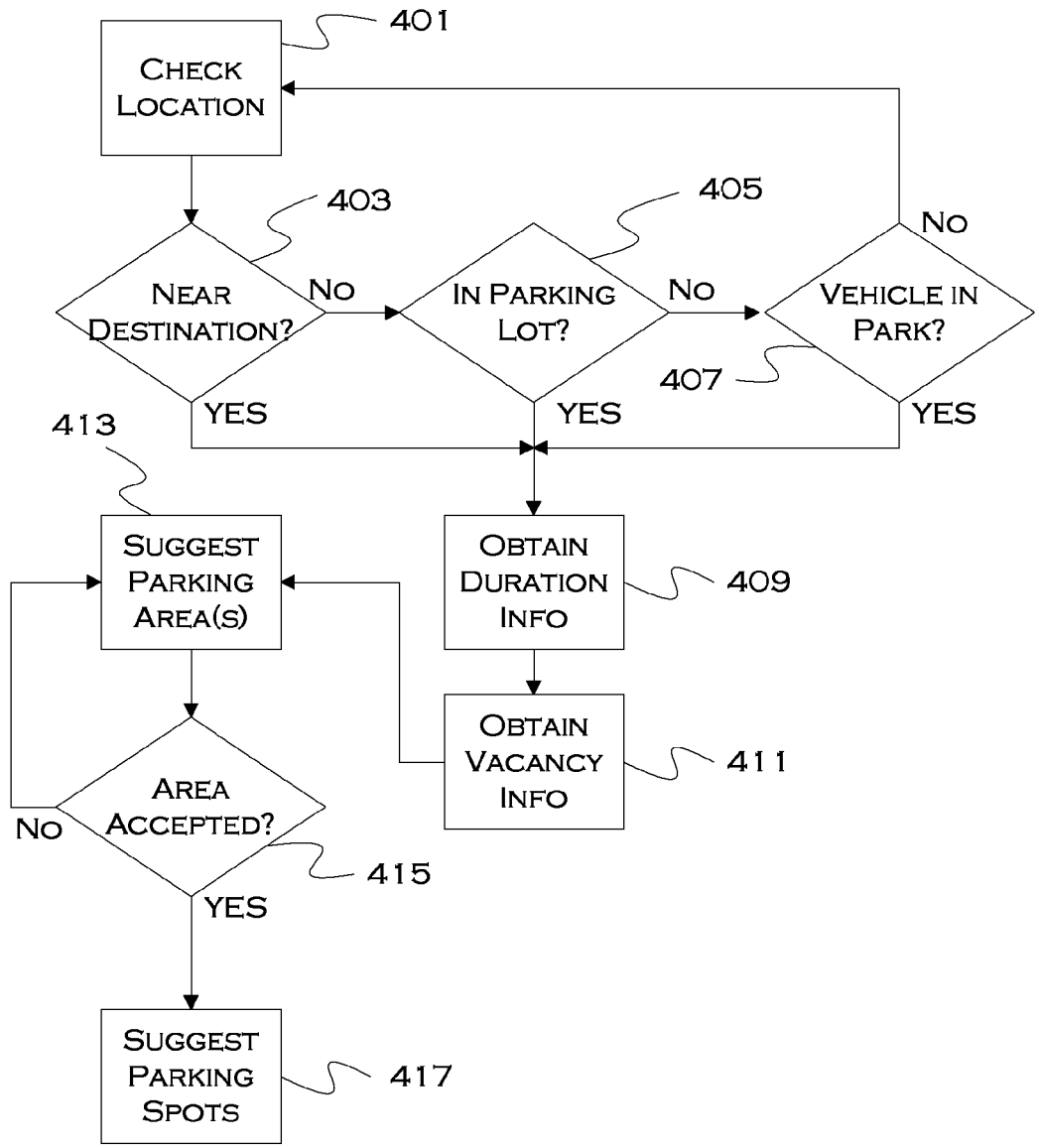
FIG. 4 shows an illustrative process for parking location recommendation.

FIG. 4 shows an illustrative process for parking location recommendation. In this illustrative example, a driver will be provided with recommendations for parking a vehicle, based on current weather conditions, time of day, and observed or extrapolated characteristics of local parking locations.

The process checks a current vehicle location 401 to determine if the vehicle is proximate to a known destination 403. If the vehicle is not at/near the destination, the process checks to see if the vehicle is in a parking lot 405. This may be relevant, because the vehicle may be stopping on the way to an eventual destination. If the vehicle is not in a parking lot, the process also checks to see if the vehicle is in park 407, which may also indicate an intent to stop for some time period.

If any of these conditionals apply, the process obtains information from the driver on how long of a stay is intended 409. This information could also be "guessed" by a vehicle, based on a business at which the vehicle is currently present (charging station, restaurant, etc.). The process also attempts to obtain vacancy information for known, local parking locations 411. This can be done by checking which known vehicles are currently parked at the present location, for example. Of course, the more vehicles that are on a network, the more accurate this data will be.

Based on assumed to be available parking, or at least, avoiding spaces known to be in use, the process may suggest parking spots or general areas where optimal battery life preservation characteristics are environmentally present 413. Once an area is accepted by a driver 415, the process may further suggest the "best" spots in the area 417.

Figure 5:
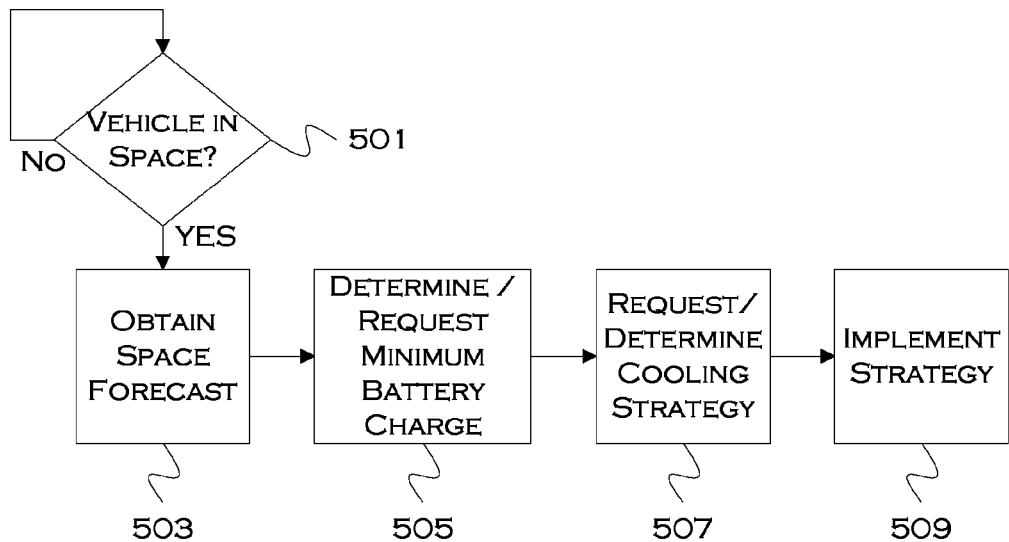
FIG. 5 shows an illustrative charging process, incorporating battery life preservation.

FIG. 5 shows an illustrative charging process, incorporating battery life preservation. This strategy employs the known or projected characteristics of the space, along with knowledge about a driver's continuing journey, to optimize a cooling strategy for a battery.

In this example, based on current weather, time of day and time of year, and known or projected characteristics of a space, the process obtains a space profile forecast 503. This can be for the duration of the driver's stay, so that a proper cooling strategy can be implemented.

The vehicle will also determine a minimum charge needed to complete the journey 505, so that the driver does not return to a vehicle, only to find the charge depleted beyond usefulness. Care can be taken in this determination such that a minimum drivable distance (e.g., 30 miles) always is preserved, no matter what. Then, in this example, the process determines an optimal cooling strategy, based on the amount of charge that can be used to cool the battery, along with the space forecast 507. This and other strategies can also be obtained by the vehicle remotely, from a similar process running on a remote server (which may have greater data-access and processing power). The cooling strategy is then implemented for the duration of the vehicle's stay, as appropriate.

Figure 6:
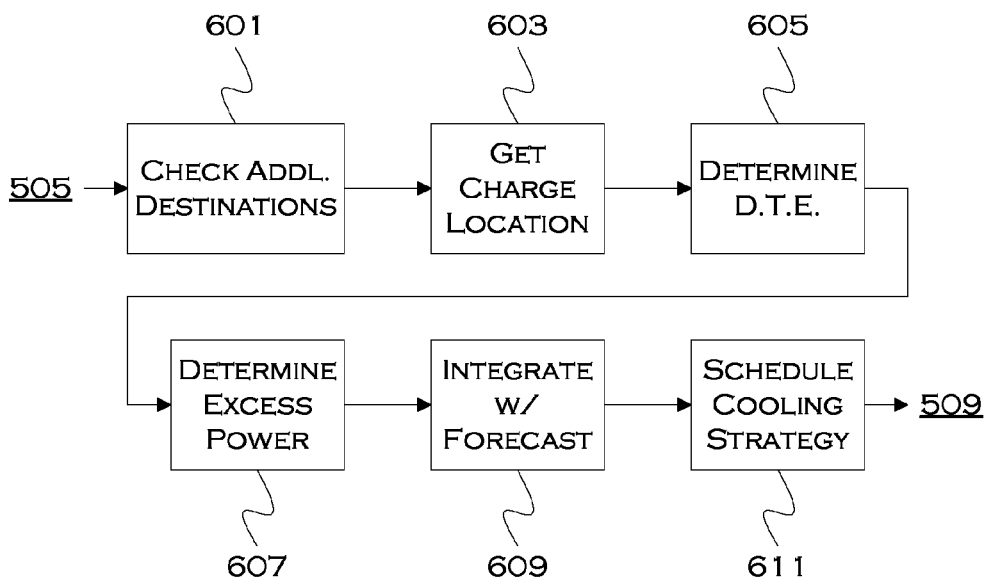
FIG. 6 shows a further illustrative charging process, incorporating battery life preservation.

FIG. 6 shows a further illustrative charging process, incorporating battery life preservation. Here, a trip may have multiple destinations associated therewith. Accordingly, a more comprehensive cooling strategy may be more appropriate, and the charge will need to be sufficient to travel to all known destinations. Additional destinations along a route are determined 601, as well as a known, preferred charging location (e.g., home, a certain station, etc.) 603.

The process also determines a distance to empty 605 and, based on this information, what level of excess power remains for usage in a cooling strategy 607. This information is integrated with a forecast for the entire route, along with likely parking for the entire route 609 to profile parking and weather for the whole route. A cooling strategy is then implemented for the whole journey.

For example, if a vehicle is to travel to a parking garage for two hours and then to an open mall parking lot for two hours, and only two hours of power to cool the battery remains, the process may wish to save this power for when the vehicle is in the open, presumably hotter, mall parking lot. In this manner, a comprehensive entire-route strategy can serve to better preserve vehicle battery life.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive parking space environmental characteristics, from a parked vehicle;
download weather data for an area containing the parking space, during a time while the vehicle was parked;
correlate the weather data to the environmental characteristics to build a parking space environment profile; and
update a stored parking space model based on the environment profile to reflect how the particular space is affected by weather conditions.

2. The system of claim 1, wherein the environmental characteristics are based on vehicle sensor data.

3. The system of claim 1, wherein the environmental characteristics are wirelessly received from a vehicle computer.

4. The system of claim 1, wherein the environmental characteristics include temperature.

5. The system of claim 1, wherein the environmental characteristics include humidity.

6. The system of claim 1, wherein the environmental characteristics include wind speed.

7. The system of claim 1, wherein the environmental characteristics include ambient light.

8. A system comprising:
a processor configured to:
retrieve an environmental model for a parking location;
retrieve weather data for the parking location;
build a forecast model for the parking location covering an estimated parking duration, including the affect of the weather data on individual parking spaces based on the environmental model;
determine a first parking space having better battery life preservation likelihood than another parking space, within the parking location, based on the forecast model; and
recommend the first parking space.

9. The system of claim 8, the processor further configured to determine that a vehicle is proximate to a parking location including a determination that a vehicle is near a destination.

10. The system of claim 8, the processor further configured to determine that a vehicle is proximate to a parking location including a determination that a vehicle is in a parking lot.

11. The system of claim 8, the processor further configured to determine that a vehicle is proximate to a parking location including a determination that a vehicle transmission is in a parked state.

12. The system of claim 8, wherein the environmental model is based on data stored with respect to the parking location.

13. The system of claim 8, wherein the environmental model is extrapolated from data stored with respect to a proximate-parking-location sharing predefined characteristics with the parking location.

14. A system comprising:
a processor configured to:
receive a forecast model for a parking space in which the vehicle is parked, for an estimated parking duration;
determine surplus battery energy;
determine a cooling strategy for a vehicle battery, based on the surplus energy and the forecast model; and
implement the cooling strategy by using surplus power to cool the battery in accordance with the strategy while the vehicle remains parked.

15. The system of claim 14, wherein the surplus amount of battery energy is energy above and beyond that needed to complete a planned trip.

16. The system of claim 15, wherein the surplus amount of battery energy is reduced by a predetermined reserve amount.

17. The system of claim 14, wherein the forecast model is based at least in part on data gathered from vehicles previously parked in the parking space.

18. The system of claim 14, wherein the forecast model is based at least in part on retrieved weather data.

19. The system of claim 14, wherein the estimated parking duration is based on driver input.

20. The system of claim 14, wherein the estimated parking duration is based on observed driver behavior.

* * * * *